United States Patent [19]
Rhodes

[11] Patent Number: 5,636,672
[45] Date of Patent: Jun. 10, 1997

[54] AUTOMATIC SHAPING DEVICE

[76] Inventor: William J. Rhodes, 3343 Campground Rd., Louisville, Ky. 40211

[21] Appl. No.: 532,246

[22] Filed: Sep. 22, 1995

[51] Int. Cl.$^6$ ..................................................... B27C 5/02
[52] U.S. Cl. ...................... 144/145.2; 144/154; 144/372; 409/85; 409/110; 409/111
[58] Field of Search ..................... 144/137, 143, 144/145.1, 145.2, 154, 372, 373; 409/97, 85, 110, 111, 134

[56] References Cited

U.S. PATENT DOCUMENTS

| | | | |
|---|---|---|---|
| 1,809,488 | 6/1931 | Neale et al. | 144/145.2 |
| 2,142,863 | 1/1939 | Whitney | 144/145.2 |
| 3,541,922 | 11/1970 | Dunlap | 144/144.1 |
| 3,865,162 | 2/1975 | Schmidt | 144/144.1 |
| 4,036,269 | 7/1977 | Rhodes . | |
| 4,167,962 | 9/1979 | Rhodes et al. . | |
| 4,241,771 | 12/1980 | Rhodes et al. . | |
| 5,012,846 | 5/1991 | Rhodes . | |

*Primary Examiner*—W. Donald Bray
*Attorney, Agent, or Firm*—Middleton & Reutlinge; Charles G. Lamb

[57] ABSTRACT

An improved automatic shaping device wherein the shaping device includes a frame, a table mounted onto the frame, a movable template mounted onto the table, the table, a power-driven workpiece carrying member mounted to the table and a feed device for feeding the workpiece to a shaper mounted above the table wherein the shaper is provided with a shaper. The improvement includes a shaper mounted above the table wherein the shapper is provided with a vertically extending rotatable shaft having an upper end and a lower end wherein the upper end is in communication with a motorized drive and a cutter or shaper is attached to the lower end of the rotatable shaft.

6 Claims, 4 Drawing Sheets

1

AUTOMATIC SHAPING DEVICE

BACKGROUND OF THE INVENTION

This invention relates to automatic shaping equipment and particularly relates to an automatic shaping device including an improved drive system for a cutting assembly and cutter or the shaping device.

In the production of duplicate workpieces having irregular shapes, such as for example, pieces that go into making wood furniture, many different types of feeding devices are used for feeding workpieces to cutting or shaping tools. Most of the feeding devices include means to mount templates or patterns thereon with means to follow the patterns and feed the workpieces to cutting or shaping machines in conformity with a predetermined pattern. In the arrangement of the drive means for the shapers or cutters of the automatic shaping devices, the cutting tool is generally mounted directly to the motor drive for the shaper or cutter wherein the shaper or cutter is mounted onto a shaft which extends vertically upward from the motor drive. Arrangements for such drives are shown in U.S. Pat. No. 4,036,269; U.S. Pat. No. 4,167,962; and, U.S. Pat. No. 4,241,771.

SUMMARY OF THE INVENTION

The present invention provides an improvement in the arrangement for the cutter and drive means for the cutter for an automatic shaping device. The present invention further provides for a cutter for an automatic shaping device wherein the cutter is mounted to the lower end of a vertically extending rotatable shaft. The present invention even provides a cutter for an automatic shaping device wherein the cutter and the cutter assembly therefore are movable in relation to a work piece to be cut or shaped. The present invention also provides for an automatic shaping device which is compact in arrangement.

Various other features of the present invention will occur to those skilled in the art upon reading the disclosure set forth hereinafter.

More particularly, the present invention provides in an improved automatic shaping device that includes a frame, a table mounted onto said frame, a movable template mounted onto said table, means to move said template, a workpiece carrying member mounted to said table, and means to feed a workpiece to a shaping means, the improvement comprising:

a shaping means mounted above said table, said shaping means including a vertically extending rotatable shaft having an upper end and a lower end wherein said upper end is driven by drive means and a cutting member is attached to said lower end.

It is to be understood that a description of the present invention given hereinafter are not by way of limitation of various modifications and scope of the present invention will occur to those skilled in the art upon reading the disclosure set forth hereinafter.

BRIEF DESCRIPTION OF THE DRAWINGS

Referring to the drawing.

DESCRIPTION OF THE PREFERRED EMBODIMENT

Figure 1:
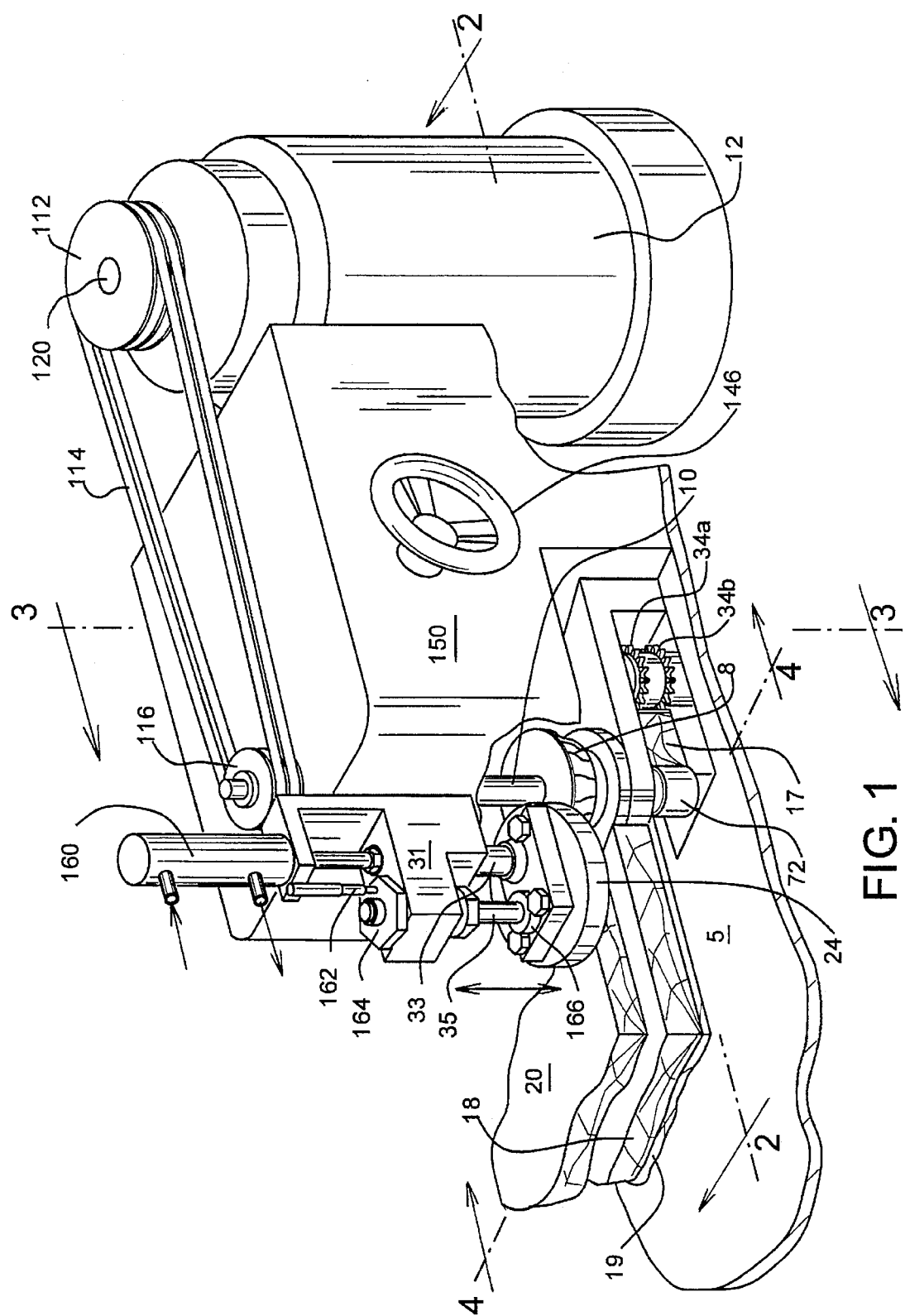
FIG. 1 is a perspective view, partially cut-away, of an automatic shaping device of the present invention.
Figure 2:
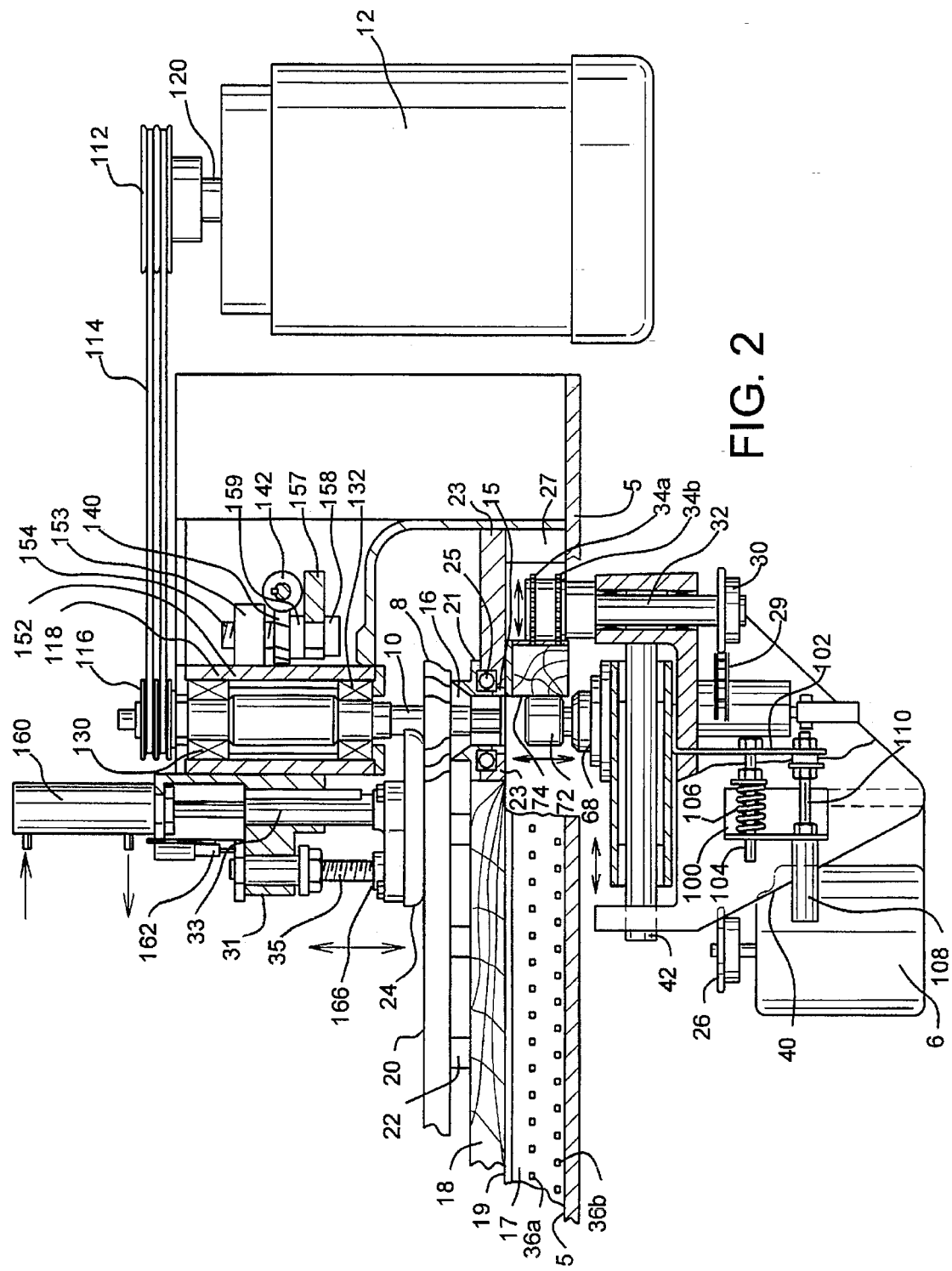
FIG. 2 is a cross-sectional view taken in a plane passing through line 2—2 of FIG. 1.
Figure 5:
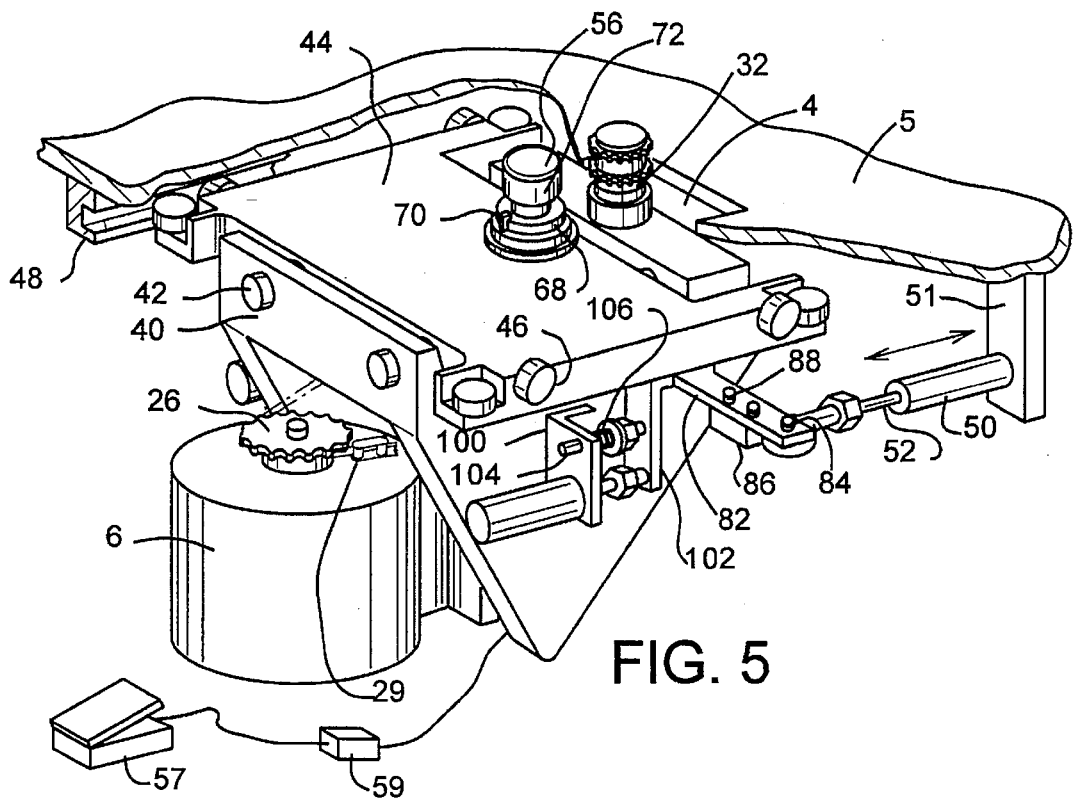

In a preferred embodiment of the present invention, as shown in FIGS. 1, 2, and 5, a feed device for shaping equipment includes a large horizontal table top 5 with a smooth surface from which objects can slide around with complete freedom of movement by rotation or translation, or both. And, as best shown in FIG. 2, a track 17 is mounted onto the table 5 for movement thereon upon engagement with drive means, to be discussed hereinafter. Mounted onto the track 17 is a pallet 19 which supports a template 18 and a workpiece 20. For a better understanding of one workpiece feed assembly for use with a cam follower assembly of the present invention, reference is made to U.S. Pat. No. 3,447,420.

A conventional rotary cutting tool 8 is mounted for rotation on a lower end of a rotatable cutter shaft 10 which is driven by a conventional motor in a housing 12. To an upper end of the shaft 10 is attached a belt driven sheave (idler pulley) 116. The belt driven sheave 116 is spaced from a belt drive sheave 112 and connecting the two sheaves 112, 116 is a pair of V-shaped belts 114. The belt drive sheave 112 is attached to the upper-most end of a drive shaft 120 which is energized and rotated by the conventional motor in housing 12.

A bearing housing 118 is provided with a pair of bearings 130 and 132 therein for receiving the cutter shaft 10 therethrough. Close below and to support the cutter 8, a rotatable shaft collar 16 of conical shape, coaxial with the shaft 10 is provided. Shaft collar 16 is spaced from and surrounded by a bearing assembly preferably with a split shaft collar such as collar 15. Split shaft collar 15 is in two portions, an upper rotatable portion 21 and a lower stationary ring portion 23 with bearings 25 therebetween. The lower stationary ring portion 23 is mounted to housing 27 which is mounted onto table 5.

Figure 3:
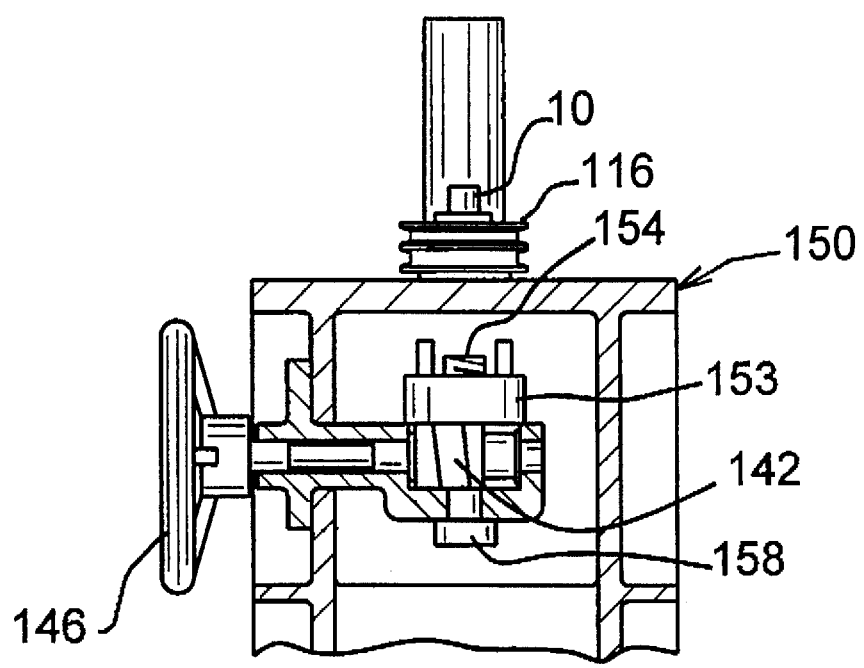
FIG. 3 is a cross-sectional view taken in a plane passing through line 3—3 of FIG. 1.
Figure 4:
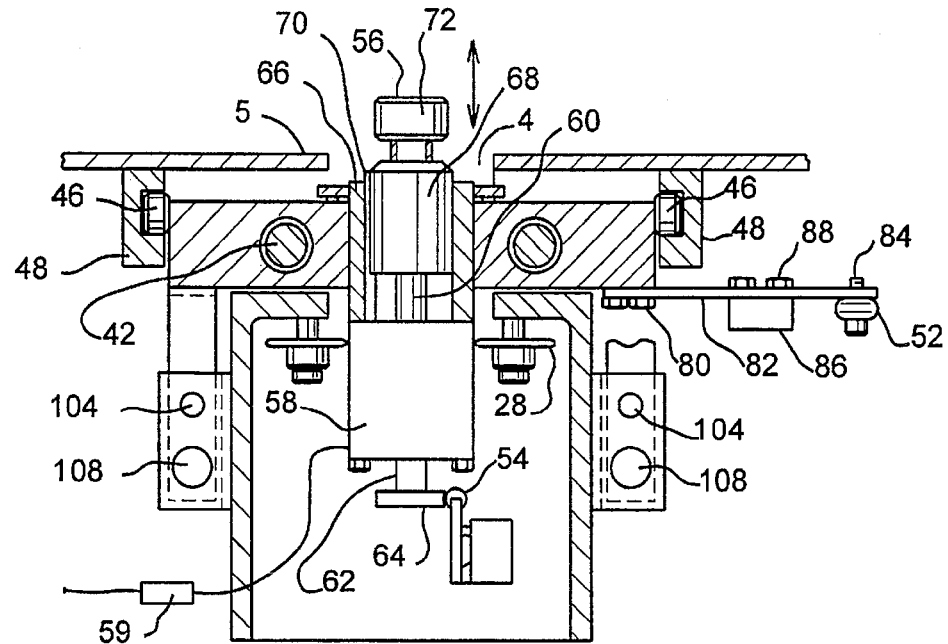
FIG. 4 is a cross-sectional view taken in a plane passing through line 4—4 of FIG. 1; and, FIG. 5 is a perspective view, partially cut-away, of another section of the automatic shaping device of the present invention.

Means are provided to raise and lower the cutter generally about a distance up to ¼". A cutter height adjusting assembly is mounted onto vertical wall 152 of housing 118 and is enclosed within a stationarily mounted housing 150 (FIG. 1). As best shown in FIG. 3, the adjusting assembly includes a vertically extending threaded shaft 154 which extends through a threaded opening in a stationarily horizontally extending adjusting nut member 153. As shown in FIG. 2, collars 158 and 159 are disposed on the lower end of the threaded shaft 154 on opposite sides of stationarily mounted plate member 157 which is mounted onto one inside wall of housing 150. Plate 157 is provided with an opening therein to receive a non-threaded portion of threaded shaft 154 therethrough. Approximately mid-way of the threaded shaft 154 is a wheel gear 140 which is in rotatable communication with a horizontally extending worm gear 142 that attaches to turn handle 146. Turn handle 146 is positioned outside the housing 150. Upon turning of the worm gear 142, the wheel gear 140 in turn rotates the shaft 154 and the rotation of the shaft 154 moves the bearing housing 130 and the cutter shaft 10 extending therethrough either up or down.

As shown in FIG. 1 and 2, a hold down means, shown as a stationary shoe 24, is operated in response to an air driven piston 33. An air cylinder 160 for operating piston 33 is provided with an air inlet and air outlet wherein the inlet and outlet air is operable in response to a pneumatic switch 162 which operates, for example, solenoid valves (not shown) or any other well known means for providing air to or from air cylinder 160. The shoe 24 is attached to piston 33 and movable therewith. A threaded rod 35 for adjusting different thicknesses of parts is also provided for final adjustment of the shoe 24 upon a workpiece for cutting. The threaded rod 35 is received within a bracket 31 which is attached to a side of housing 150. The lower extremity of rod 3S is attached to a stop member 166 and at its upper extremity to nut 164 which is affixed to bracket 31. In use, the threaded rod 3S may be incrementally turned thereby changing the travel of piston 33 in its downward movement and in turn changing the shoe 24 for different thicknesses of workpieces 80 to be cut or shaped.

In FIG. 5, table top 5 is provided with an opening 4 therethrough to receive the drive means for the feed device of the present invention. The drive means includes a drive motor 6 to which a driving sprocket 26 is mounted and driven thereby. The drive means further includes a sprocket wheel 30 with an appropriate chain 29 to which a vertically extending rotatable mounted drive shaft 32 is attached. Idlers, not shown, may also be used for alignment of chain 29 from the drive sprocket 26 to the sprocket wheel 30, if desired. Mounted to the upper extremity drive shaft 32 is a twin unit pinion having an upper set of teeth 34a and a lower set of teeth 34b for engaging with cooperating apertures and track 17, track 17 having two rows of apertures identifiable by numerals 36a and 36b. The two sets of teeth 34a and 34b are rigid with respect to each other and coaxial therewith. Preferably, the teeth of 34a and 34b are offset in respect to each other by half a pitch of the gear teeth so that the upper row of apertures 36a receive the teeth 34a and the lower row of apertures 36b receive the teeth 34b. This offset arrangement enables teeth 34a to be in transaction from one track tooth to the next and simultaneously therewith teeth 34 are in the middle of their working path so they have perfect and effective arrangement at a time when teeth 34a are positioned at angles whereby they do not carry the load effectively. This enables smooth and effective driving of the track 17.

The feed device includes a stationarily mounted frame 40 with a pair of aligned apertures on opposed sides thereof to receive a pair of rod members 42 therethrough. Rod members 42 slidably support a movable flat plate member 44 thereon. The flat plate member 44 on opposed sides thereof is provided with a pair of aligned apertures through which the rod members 42 are received. Movable flat plate member 44 is provided with a pair of rollers 46 on each end thereof, movable within elongated brackets 48 of L-shaped cross section. Brackets 48 are fixedly attached, generally by welding to the underside of table 5. The driving force for moving the feed device in a horizontal direction is an air cylinder 50 fixedly attached to table 5 with bracket 51 with a movable piston 52 therein movable in response to actuation of a pneumatic switch 54. Pneumatic switch 54 is actuated by the movement of cam follower assembly 56 thereby. The cam follower assembly 56 includes an air cylinder 58 disposed in an upper direction with a movable piston 60 extending therethrough. The movable piston 60 on the lower end thereof includes a shaft 62 movable therewith with a flange 64 on its lower extremity. Flange 64 is disposed for engagement with switch 54 as the piston 60 moves thereby. Actuation of piston 60 is in response to any known means in the art, such as a manually operated switch means with an appropriate actuation device, such as foot pedal 57 with appropriate electric connection therefor. Since actuation means are well known in the art, they are not discussed further herein.

Cam follower assembly 56 includes a guide sleeve 66 fixedly attached to the upper end of air cylinder 58 to receive movable collar 68 therein. Sleeve 66 is provided with a key-way to receive a key 70 therein. Key 70 is attached to the collar 68. On the upper extremity of the piston 60 is a cam follower 72, cam follower 72 being movable upon movement of piston 70 and disposed for engagement with the inner surface 74 (FIG. 2) of track 17.

Bolted to the underside of flat plate member 44 by bolts 80 is a horizontally extending flat support 82 to which one end of the piston 52 is attached, piston 52 being bolted to support 82 by bolt member 84. Also attached to the support 82 is a stop member 86 which is a vertically attached flat plate member, stop member 86 being attached to the support 82 by bolt members 88.

The feed device is also provided with biasing means to hold the cam follower 72 against the inner surface 74 of track 17 and yet allow for varying thicknesses of track 17 without interfering with the operation of the device of the present invention. Biasing means includes an outwardly extending L-shaped bracket 100 fixedly attached, generally by welding, to frame member 40. Another L-shaped bracket 102, which is downwardly extending and fixedly attached to movable plate member 44, generally by welding, is also provided. Bracket 100 includes an aperture therein to receive a bolt 104 therethrough. Bolt 104 extends through the bracket 100 and is fixedly attached to bracket 102 with a spiral spring 106 therearound disposed between brackets 100 and 102. An air cylinder 108 with piston 110 operable thereby is also attached to brackets 100 and 102 to maintain a positive pressure on plate member 44 through the bracket 102. Thus, upon changes in the thickness or other variables of the track 17, cooperation of the biasing means and the air cylinder means allows for movement of the cam follower assembly 56 to compensate for a malfunction without harming the equipment. As best shown in FIG. 2, for best utilization of floor space and compactness of the apparatus, the track 17 drive means is positioned so that the cam follower 72 of the drive means is beneath or in substantial alignment with the rotatable cutter shaft 10.

In the operation of the shaping device of the present invention, template 18 and workpiece 20 are mounted onto a pallet 19, as discussed hereinbefore, with a stationary shoe 24 being placed upon workpiece 20 to hold the workpiece 20 in a fixed position upon the pallet 19. Stationary shoe 24 may be adjusted by its fixed position upon the pallet 19 by the threaded rod or shaft 35. Foot pedal 57 is then depressed to actuate pneumatic valve 59 and air cylinder 58 which moves cam follower assembly 56 upwardly from its lowered position. As cam follower assembly 56 moves upwardly, flange 64 of piston 60 moves past pneumatic switch 54 which actuates air cylinder 50. Air cylinder 50, having a piston 52 attached to appropriate linkage to plate member 44, pulls the plate member 44 with cam follower assembly 56 attached thereto into engagement with the inner surface of track 17. The cutter 8 is then adjusted vertically in relation to the workpiece. Upon completion of the adjustment of the cutter 8, the drive motor 12 is then energized and the cutter 8 then starts its rotation or cutting condition. Drive motor 6 for the feed device is then energized and through cooperating drive elements discussed hereinbefore, drives a twin pinion 34 thereby turning the workpiece 20 in conformity to the template 18.

It will be realized that various changes may be made to the specific embodiment shown and described without departing from the principal of the present invention.

What is claimed is:

1. In an automatic shaping device that includes a frame, a table mounted onto said frame, a movable template mounted onto said table, means to move said template, a workpiece carrying member mounted to said table and means to feed a workpiece to said shaping means, the improvement comprising:

a shaping means stationarily mounted above said table and said means to move said template and said means to move said workpiece, said shaping means including a cutter attached to a lower end of a vertically extending rotatable cutter shaft, said rotatable cutter shaft being in energizing relationship with a first drive means.

2. In an automatic shaping device of claim 1, said rotatable cutter shaft having an upper end with a belt driven sheave mounted thereto, spaced from said belt driven sheave and in alignment therewith being a belt drive sheave which is attached to one end of a rotatable driven shaft, and at least one endless belt connecting said belt driven sheave to said belt drive sheave.

3. In an automatic shaping device of claim 1, including means to vertically adjust said cutter.

4. In an automatic shaping device of claim 1, including an air operated workpiece holding device wherein said workpiece holding device includes means to make incremental changes in the location of the holding device whereby said holding device can be adjusted for various thicknesses of workpieces.

5. In an automatic shaping device of claim 1, said means to move said template, includes a track having an inner surface, said track movable in response to a second drive means and a cam follower, said cam follower being engagable with said inner surface of said track.

6. In an automatic shaping device of claim 5, said cam follower being in axial alignment with said rotatable cutter shaft.

* * * * *